US011179696B2

(12) United States Patent
Griffiths et al.

(10) Patent No.: US 11,179,696 B2
(45) Date of Patent: Nov. 23, 2021

(54) HIGH-THROUGHPUT DYNAMIC REAGENT DELIVERY SYSTEM (71) Applicants: THE BROAD INSTITUTE INC., Cambridge, MA (US); Ecole Supérieure de Physique et de Chimie Industrielles de la Ville de Paris, Paris (FR); Centre National de la Recherche Scientifique, Paris (FR)

(72) Inventors: Andrew D. Griffiths, Paris (FR); Marie Leman, Ivry-sur-Seine (FR); Robert Nicol, Cambridge, MA (US); Scott Steelman, Wilmington, MA (US); Patrick Tabeling, Paris (FR)

(*) Notice: Subject to any disclaimer, the term of this patent is extended or adjusted under 35 U.S.C. 154(b) by 524 days.

(21) Appl. No.: 14/726,070

(22) Filed: May 29, 2015

(65) Prior Publication Data
US 2015/0258520 A1    Sep. 17, 2015

Related U.S. Application Data (63) Continuation-in-part of application No. PCT/US2013/072575, filed on Dec. 2, 2013.

(60) Provisional application No. 61/732,182, filed on Nov. 30, 2012.

(51) Int. Cl.
| B01J 19/00 | (2006.01) |
| B01L 3/00 | (2006.01) |
| B01L 3/02 | (2006.01) |
| B01F 15/02 | (2006.01) |
| B01F 13/00 | (2006.01) |
| B01F 5/04 | (2006.01) |
| B01F 3/08 | (2006.01) |

(52) U.S. Cl.
CPC ......... B01J 19/0046 (2013.01); B01F 3/0807 (2013.01); B01F 5/0473 (2013.01); B01F 13/0062 (2013.01); B01F 13/0071 (2013.01); B01F 13/0076 (2013.01); B01F 15/0246 (2013.01); B01L 3/0268 (2013.01); B01L 3/502715 (2013.01); B01L 3/502784 (2013.01); B01J 2219/00378 (2013.01); B01J 2219/00698 (2013.01); B01J 2219/00722 (2013.01); B01J 2219/00727 (2013.01); B01L 2200/0673 (2013.01); B01L 2200/16 (2013.01); B01L 2300/0867 (2013.01); B01L 2400/0403 (2013.01); B01L 2400/0415 (2013.01)

(58) Field of Classification Search
CPC ............. B01F 15/0246; B01F 13/0071; B01J 19/0046; B01J 2219/00378; B01J 2219/00698; B01L 3/0268; B01L 2200/16; B01L 2300/0867
See application file for complete search history.

(56) References Cited

U.S. PATENT DOCUMENTS

| 7,041,481 | B2 | 5/2006 | Anderson et al. | |
| 2007/0195127 | A1* | 8/2007 | Ahn | B01F 13/0071 347/55 |
| 2008/0003142 | A1 | 1/2008 | Link et al. | |
| 2008/0014589 | A1 | 1/2008 | Link et al. | |
| 2008/0227663 | A1* | 9/2008 | Tisone | B01J 19/0046 506/39 |
| 2010/0018584 | A1* | 1/2010 | Bransky | B01F 3/0807 137/2 |
| 2010/0055677 | A1 | 3/2010 | Colston, Jr. | |
| 2010/0137163 | A1 | 6/2010 | Link et al. | |
| 2010/0163412 | A1* | 7/2010 | Attinger | F16K 99/0019 204/453 |
| 2010/0270156 | A1* | 10/2010 | Srinivasan | B01F 13/0071 204/450 |
| 2011/0000560 | A1 | 1/2011 | Miller et al. | |
| 2011/0092376 | A1* | 4/2011 | Colston, Jr. | B01F 3/0807 506/7 |
| 2011/0311978 | A1 | 12/2011 | Makarewicz, Jr. | |
| 2012/0152369 | A1* | 6/2012 | Hiddessen | B01L 3/502784 137/14 |
| 2012/0219947 | A1 | 8/2012 | Yurkovetsky et al. | |

FOREIGN PATENT DOCUMENTS

| EP | 2047910 B1 | 1/2012 |
| WO | 2007089541 A2 | 8/2007 |
| WO | WO 2012/142192 | 10/2012 |

OTHER PUBLICATIONS

Schöndube, J., et al. ("Picoliter Droplet Dispenser with Integrated Impedance Detector for Single-cell Printing." Proceedings 13th International Conference on New Actuators; Jun. 18-20, 2012). (Year: 2012).*
Guo et al., "Droplet microfluidics for high-throughput biological assays," Lab on a Chip, 2012, vol. 12, pp. 2146-2155.

* cited by examiner

*Primary Examiner* — Sahana S Kaup
(74) *Attorney, Agent, or Firm* — Melissa Hunter-Ensor; Nicholas R. Ballor; Greenberg Traurig, LLP

(57) ABSTRACT

The present invention relates to systems and methods for manipulating droplets within a high through put microfluidic system.

11 Claims, 3 Drawing Sheets

FIG. 3

HIGH-THROUGHPUT DYNAMIC REAGENT DELIVERY SYSTEM

RELATED APPLICATIONS AND/OR INCORPORATION BY REFERENCE

This application is a continuation in part of international application PCT/US2013/072575 filed Dec. 2, 2013, which published as PCT Publication No. WO 2014/085802 on Jun. 5, 2014 and which claims benefit of and priority to U.S. provisional patent application Ser. No. 61/732,182 filed Nov. 30, 2012.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention generally relates to a dynamic reagent delivery system utilizing a controlled actuator.

BACKGROUND OF THE INVENTION

Performing studies that require data resolution at the single cell (or single molecule) level can be challenging or cost prohibitive under the best circumstances. Although techniques or instruments for single molecule or single cell analysis exist (e.g., digital polymerase chain reactions (PCR) or Fluidigm C1, respectively), none currently allow a scalable method for dynamically delivering reagents and/or appending molecular "information" to individual reactions such that a large population of reactions/assays can be processed and analyzed en masse while still maintaining the ability to partition results by individual reactions/assays.

Microfluidics involves micro-scale devices that handle small volumes of fluids. Because microfluidics may accurately and reproducibly control and dispense small fluid volumes, in particular volumes less than 1 µl, application of microfluidics provides significant cost-savings. The use of microfluidics technology reduces cycle times, shortens time-to-results, and increases throughput. Furthermore, incorporation of microfluidics technology enhances system integration and automation. Microfluidic reactions are generally conducted in microdroplets. The ability to conduct reactions in microdroplets depends on being able to merge different sample fluids and different microdroplets. See, e.g., US Patent Publication No. 20120219947.

Droplet microfluidics offers significant advantages for performing high-throughput screens and sensitive assays. Droplets allow sample volumes to be significantly reduced, leading to concomitant reductions in cost. Manipulation and measurement at kilohertz speeds enable up to $10^8$ samples to be screened in a single day. Compartmentalization in droplets increases assay sensitivity by increasing the effective concentration of rare species and decreasing the time required to reach detection thresholds. Droplet microfluidics combines these powerful features to enable currently inaccessible high-throughput screening applications, including single-cell and single-molecule assays. See, e.g., Guo et al., Lab Chip, 2012, 12, 2146-2155.

Although there are many advantages for studying biological processes via droplet microfluidics, there remains a problem in the art that it is difficult to record real time or dynamic biological or synthetic processes because samples cannot be dynamically tracked during the process.

Citation or identification of any document in this application is not an admission that such document is available as prior art to the present invention.

SUMMARY OF THE INVENTION

The invention particularly relates to a dynamic reagent delivery system utilizing a controlled actuator.

In particular, the invention relates to apparatus for creating a library of emulsion outlooks via a microfluidic system, which may comprise a carrier fluid channel having a carrier fluid flowing therein at an adjustable or predetermined flow rate, a plurality of droplet generators or a plurality of droplet dispensers and a controller in communication with the plurality of droplet generators for controlling the means for transferring a predetermined amount of fluid in each droplet generator.

Each droplet generator may have a reagent fluid supply means for providing reagent fluid to the droplet generator and an outlet channel, the outlet channel in fluid communication with a first fluid channel and a means for transferring a predetermined amount of reagent fluid from the supply means to the outlet channel such that a reagent droplet of predetermined amount is caused to enter the carrier fluid.

Each droplet dispenser may have a supply of droplets in the form of a water-in-oil emulsion and an outlet channel, the outlet channel in fluid communication with a first fluid channel and a means for transferring a predetermined volume of emulsion from the supply means to the outlet channel such that a predetermined volume of emulsion is caused to enter the carrier fluid.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Examples of the labeling substance which may be employed include labeling substances known to those skilled in the art, such as fluorescent dyes, enzymes, coenzymes, chemiluminescent substances, and radioactive substances. Specific examples include radioisotopes (e.g., $^{32}P$, $^{14}C$, $^{125}I$, $^{3}H$, and $^{131}I$), fluorescein, rhodamine, dansyl chloride, umbelliferone, luciferase, peroxidase, alkaline phosphatase, β-galactosidase, β-glucosidase, horseradish peroxidase, glucoamylase, lysozyme, saccharide oxidase, microperoxidase, biotin, and ruthenium. In the case where biotin is employed as a labeling substance, preferably, after addition of a biotin-labeled antibody, streptavidin bound to an enzyme (e.g., peroxidase) is further added.

Advantageously, the label is a fluorescent label. Examples of fluorescent labels include, but are not limited to, Atto dyes, 4-acetamido-4'-isothiocyanatostilbene-2,2'disulfonic acid; acridine and derivatives: acridine, acridine isothiocyanate; 5-(2'-aminoethyl)aminonaphthalene-1-sulfonic acid (EDANS); 4-amino-N-[3-vinylsulfonyl)phenyl]naphthalimide-3, 5 disulfonate; N-(4-anilino-1-naphthyl)maleimide; anthranilamide; BODIPY; Brilliant Yellow; coumarin and derivatives; coumarin, 7-amino-4-methylcoumarin (AMC, Coumarin 120), 7-amino-4-trifluoromethylcouluarin (Coumaran 151); cyanine dyes; cyanosine; 4',6-diaminidino-2-phenylindole (DAPI); 5'5"-dibromopyrogallol-sulfonaphthalein (Bromopyrogallol Red); 7-diethylamino-3-(4'-isothiocyanatophenyl)-4-methylcoumarin; diethylenetriamine pentaacetate; 4,4'-diisothiocyanatodihydro-stilbene-2,2'-disulfonic acid; 4,4'-diisothiocyanatostilbene-2,2'-disulfonic acid; 5-[dimethylamino]naphthalene-1-sulfonyl chloride (DNS, dansylchloride); 4-dimethylaminophenylazophenyl-4'-isothiocyanate (DABITC); eosin and derivatives; eosin, eosin isothiocyanate, erythrosin and derivatives: erythrosin B, erythrosin isothiocyanate; ethidium; fluorescein and derivatives; 5-carboxyfluorescein (FAM), 5-(4,6-dichlorotriazin-2-yl)amino-fluorescein (DTAF), 2',7'-dimethoxy-4'5'-dichloro-6-carboxyfluorescein, fluorescein, fluorescein isothiocyanate, QFITC, (XRITC); fluorescamine; IR144; IR1446; Malachite Green isothiocyanate; 4-methylumbelliferoneortho cresolphthalein; nitrotyrosine; pararosaniline; Phenol Red; B-phycoerythrin; o-phthaldialdehyde; pyrene and derivatives: pyrene, pyrene butyrate, succinimidyl 1-pyrene; butyrate quantum dots; Reactive Red 4 (Cibacron™ Brilliant Red 3B-A) rhodamine and derivatives: 6-carboxy-X-rhodamine (ROX), 6-carboxyrhodamine (R6G), lissamine rhodamine B sulfonyl chloride rhodamine (Rhod), rhodamine B, rhodamine 123, rhodamine X isothiocyanate, sulforhodamine B, sulforhodamine 101, sulfonyl chloride derivative of sulforhodamine 101 (Texas Red); N,N,N',N' tetramethyl-6-carboxyrhodamine (TAMRA); tetramethyl rhodamine; tetramethyl rhodamine isothiocyanate (TRITC); riboflavin; rosolic acid; terbium chelate derivatives; Cy3; Cy5; Cy5.5; Cy7; IRD 700; IRD 800; La Jolta Blue; phthalo cyanine; and naphthalo cyanine.

The fluorescent label may be a fluorescent protein, such as blue fluorescent protein, cyan fluorescent protein, green fluorescent protein, red fluorescent protein, yellow fluorescent protein or any photoconvertible protein. Colormetric labeling, bioluminescent labeling and/or chemiluminescent labeling may further accomplish labeling. Labeling further may include energy transfer between molecules in the hybridization complex by perturbation analysis, quenching, or electron transport between donor and acceptor molecules, the latter of which may be facilitated by double stranded match hybridization complexes. The fluorescent label may be a perylene or a terrylen. In the alternative, the fluorescent label may be a fluorescent bar code.

In an advantageous embodiment, the label may be light sensitive, wherein the label is light-activated and/or light cleaves the one or more linkers to release the molecular cargo. The light-activated molecular cargo may be a major light-harvesting complex (LHCII). In another embodiment, the fluorescent label may induce free radical formation.

In an advantageous embodiment, agents may be uniquely labeled in a dynamic manner (see, e.g., U.S. provisional patent application Ser. No. 61/703,884 filed Sep. 21, 2012). The unique labels are, at least in part, nucleic acid in nature, and may be generated by sequentially attaching two or more detectable oligonucleotide tags to each other and each unique label may be associated with a separate agent. A detectable oligonucleotide tag may be an oligonucleotide that may be detected by sequencing of its nucleotide sequence and/or by detecting non-nucleic acid detectable moieties to which it may be attached.

The oligonucleotide tags may be detectable by virtue of their nucleotide sequence, or by virtue of a non-nucleic acid detectable moiety that is attached to the oligonucleotide such as but not limited to a fluorophore, or by virtue of a combination of their nucleotide sequence and the nonnucleic acid detectable moiety.

In some embodiments, a detectable oligonucleotide tag may comprise one or more nonoligonucleotide detectable moieties. Examples of detectable moieties may include, but are not limited to, fluorophores, microparticles including quantum dots (Empodocles, et al., Nature 399:126-130, 1999), gold nanoparticles (Reichert et al., Anal. Chem. 72:6025-6029, 2000), microbeads (Lacoste et al., Proc. Natl. Acad. Sci. USA 97(17):9461-9466, 2000), biotin, DNP (dinitrophenyl), fucose, digoxigenin, haptens, and other detectable moieties known to those skilled in the art. In some embodiments, the detectable moieties may be quantum dots. Methods for detecting such moieties are described herein and/or are known in the art.

Thus, detectable oligonucleotide tags may be, but are not limited to, oligonucleotides which may comprise unique nucleotide sequences, oligonucleotides which may comprise detectable moieties, and oligonucleotides which may comprise both unique nucleotide sequences and detectable moieties.

A unique label may be produced by sequentially attaching two or more detectable oligonucleotide tags to each other. The detectable tags may be present or provided in a plurality of detectable tags. The same or a different plurality of tags may be used as the source of each detectable tag may be part of a unique label. In other words, a plurality of tags may be subdivided into subsets and single subsets may be used as the source for each tag.

The present invention provides a closed feedback control system for producing and manipulating a predetermined characteristic of a microfluidic droplet and the systematic combination of one or more droplet combinations with single or multiple cells. The invention described herein enables high throughput and high resolution delivery of reagents to individual emulsion droplets that may contain cells, nucleic acids, proteins, etc. through the use of monodisperse aqueous droplets that are generated one by one in a microfluidic chip as a water-in-oil emulsion. The droplets are carried in a flowing oil phase and stabilized by a surfactant. In one aspect single cells or single molecules (proteins, RNA, DNA) are encapsulated into uniform droplets from an aqueous solution/dispersion with a rate up to a few kHz. In a related aspect, multiple cells or multiple molecules may take the place of single cells or single molecules. The aqueous droplets of volume ranging from 1 pL to 10 nL work as individual reactors. Disclosed embodiments provide that the droplets can be manipulated and measured at a rate of $10^8$ per day using droplet-based microfluidics.

To utilize microdroplets for rapid large-scale chemical screening or complex biological library identification, different species of microdroplets, each containing the specific chemical compounds or biological probes of interest, have to be generated and combined at the preferred conditions, e.g., mixing ratio and order of combination. For example as described in US patent publication no. 20110000560, one microdroplet of species A must be combined with one microdroplet of species B, but not with two microdroplets of species B or with one microdroplet of species C. The ratio of combining different species of microdroplets is achieved by adjusting the frequencies at which microdroplets are delivered to the site of combination. The terms "frequency" or "frequencies" refer to the rate at which microdroplets of certain species are delivered to a specific location. Moreover, this frequency or rate is a number per unit time, typically several hundred to tens of thousands per second. Furthermore the terms "frequency" or "frequencies" refers to the number of times at which droplets of certain species are delivered to a specific location. The location may be where certain behaviors of droplets (e.g., pairing, merging, combination, etc.) occur or where certain actions (e.g., electrification, mechanical deformation, etc.) are applied to droplets. Preferably, the location is where combination of droplets occurs.

Each species of droplet is introduced at a confluence point in a main microfluidic channel from separate inlet microfluidic channels. Preferably, droplet volumes are chosen by design such that one species is larger than others and moves at a different speed, usually slower than the other species, in the carrier fluid, as disclosed in U.S. Publication No. US 2007/0195127 and International Publication No. WO 2007/089541, each of which are incorporated herein by reference in their entirety. The channel width and length is selected such that faster species of droplets catch up to the slowest species. Size constraints of the channel prevent the faster moving droplets from passing the slower moving droplets resulting in a train of droplets entering a merge zone. In the merge zone, droplets are induced to coalesce into a single droplet, preferably an electric field is utilized to induce coalescence. Multi-step chemical reactions, biochemical reactions, or assay detection chemistries often require a fixed reaction time before species of different type are added to a reaction. Multi-step reactions are achieved by repeating the process multiple times with a second, third or more confluence points each with a separate merge point. Highly efficient and precise reactions and analysis of reactions are achieved when the frequencies of droplets from the inlet channels are matched to an optimized ratio and the volumes of the species are matched to provide optimized reaction conditions in the combined droplets.

The present application contemplates the merging of smaller droplets into a larger droplets. In an advantageous embodiment, the smaller droplets fuse into a larger droplet. In one embodiment of the invention, larger and smaller droplets may contact each other and then fuse. For example, if a droplet comprises a surfactant, the droplet will not spontaneously fuse as the interface between the droplets are destabilized by, for example, an electric field, laser or ultrasound. Passive fusion may be chemical or involve an oil with a low surfactant concentration. Upon contact with a large droplet, the interface of a small droplet is not necessarily stable and may spontaneously fuse with a larger droplet.

Pairs of large (usually >100 nL) droplets can be fused using electrowetting in digital microfluidic systems (see, e.g., Cho et al., Microelectromech. Syst., 2003, 12, 70-80), but the number of discrete fluidic operations per second is relatively low (<0.1 kHz) (see, e.g., Srinivasan et al., Lab Chip, 2004, 4, 310-315). Alternatively, high number of droplets (>$10^7$), with volumes as small as 1 pL, flowing in a carrier oil, can be used in pairwise fashion at high frequencies (>kHz) in droplet-based microfluidic systems. There are several ways to fuse aqueous droplets using droplet-based microfluidic systems. Droplets that are not stabilized by surfactant will coalesce spontaneously (see, e.g., Tan et al., Microfluid. Nanofluid., 2007, 3, 495-499, Song et al., Angew. Chem., Int. Ed. Engl., 2003, 42, 767-772, Hung et al., Lab Chip, 2006, 6, 174-178, Niu et al., Lab Chip. 2008, 8, 1837-1841, Um and Park. Lab Chip, 2009, 9, 207-212 and Sassa et al., Anal. Chem., 2008, 80, 6206-6213), or can be coalesced based on a surface energy pattern on the walls of a microfluidic device (see, e.g., Fidalgo et al., Langmuir, 2009, 25, 2854-2859) or a new stream of fluid can be merged with large droplets passing an orifice (see, e.g., Shestopalov et al., Lab Chip, 2004, 4, 316-321 and Li et al., Anal. Chem., 2007, 79, 2756-2761). Surfactant stabilized droplets can be fused using local heating from a focused laser (see, e.g., Baroud et al., Lab Chip, 2007, 7, 1029-1033) or using electric forces (see, e.g., Link et al., Angew. Chem., Int. Ed., 2006, 45, 2556-2560 and Priest et al., Appl. Phys. Lett., 2006, 89, 134101) and electro-coalescence has been used to measure millisecond enzyme kinetics (see, e.g., Ahn et al., Appl. Phys. Lett., 2006, 88, 264105-264103) and for the synthesis of magnetic iron oxide nanoparticles (see, e.g., Frenz et al., Angew. Chem., Int. Ed., 2008, 47, 6817-6820).

Controlled one-to-one, two-to-one and three-to-one droplet fusion can also be performed in microfluidic systems by making use of transient states in the stabilization of the droplet interface by surfactant, coupled to a proper geometrical design of a coalescence module, to induce the selective fusion of droplets stabilized by surfactant with a droplet which is not fully stabilized by surfactant (Mazutis et al. (2009) Lab oChip, 18, 2665-2672; Mazutis and Griffiths (2012) Lab Chip, 12, 1800-1806).

Key elements for using microfluidic channels to process droplets include: (1) producing droplet of the correct volume, (2) producing droplets at the correct frequency and (3) bringing together a first stream of sample droplets with a second stream of sample droplets in such a way that the frequency of the first stream of sample droplets matches the frequency of the second stream of sample droplets. Preferably, bringing together a stream of sample droplets with a stream of premade library droplets in such a way that the frequency of the library droplets matches the frequency of the sample droplets.

Methods for producing droplets of a uniform volume at a regular frequency are well known in the art. One method is to generate droplets using hydrodynamic focusing of a dispersed phase fluid and immiscible carrier fluid, such as disclosed in U.S. Publication No. US 2005/0172476 and International Publication No. WO 2004/002627. Feedback on the infusion rates of the carrier fluid and the dispersed fluid provides droplets that are uniform in size and generated at a fixed frequency over arbitrarily long periods of time. However, sample to sample variations in viscosity, viscoelasticity, surface tension or other physical properties of the sample fluid coming from but not limited to the inclusion of polymers, detergents, proteins, cells, nucleic acids or buffering solutions, influence the droplet size, and, hence, frequency of generation in an unpredictable way, generating a significant problem to be solved. Hence, the same nozzle on the same substrate with same carrier fluid, but a different dispersed fluid will result in a different droplet volume at a different frequency. Moreover, often it is desirable for one of the species introduced at the confluence to be a pre-made library of droplets where the library contains a plurality of reaction conditions, e.g., a library may contain plurality of different compounds at a range of concentrations encapsulated as separate library elements for screening their effect on cells or enzymes, alternatively a library could be composed of a plurality of different primer pairs encapsulated as different library elements for targeted amplification of a collection of loci, alternatively a library could contain a plurality of different antibody species encapsulated as different library elements to perform a plurality of binding assays. The introduction of a library of reaction conditions onto a substrate is achieved by pushing a premade collection of library droplets out of a vial with a drive fluid. The drive fluid is a continuous fluid. The drive fluid may comprise the same substance as the carrier fluid (e.g., a fluorocarbon oil). For example, if a library consists of ten pico-liter droplets is driven into an inlet channel on a microfluidic substrate with a drive fluid at a rate of 10,000 pico-liters per second, then nominally the frequency at which the droplets are expected to enter the confluence point is 1000 per second. However, in practice droplets pack with oil between them that slowly drains. Over time the carrier fluid drains from the library droplets and the number density of the droplets (number/mL) increases. Hence, a simple fixed rate of infusion for the drive fluid does not provide a uniform rate of introduction of the droplets into the microfluidic channel in the substrate. Moreover, library-to-library variations in the mean library droplet volume result in a shift in the frequency of droplet introduction at the confluence point. Thus, the lack of uniformity of droplets that results from sample variation and oil drainage provides another problem to be solved. For example if the nominal droplet volume is expected to be 10 pico-liters in the library, but varies from 9 to 11 pico-liters from library-to-library then a 10,000 pico-liter/second infusion rate will nominally produce a range in frequencies from 900 to 1,100 droplet per second. In short, sample to sample variation in the composition of dispersed phase for droplets made on chip, a tendency for the number density of library droplets to increase over time and library-to-library variations in mean droplet volume severely limit the extent to which frequencies of droplets may be reliably matched at a confluence by simply using fixed infusion rates. In addition, these limitations also have an impact on the extent to which volumes may be reproducibly combined. Combined with typical variations in pump flow rate precision and variations in channel dimensions, systems are severely limited without a means to compensate on a run-to-run basis. The foregoing facts not only illustrate a problem to be solved, but also demonstrate a need for a method of instantaneous regulation of microfluidic control over microdroplets within a microfluidic channel.

As a result of the above factors, current microdroplet technologies cannot efficiently or reliably be used for applications involving combining droplets of different species at high frequencies. Consequently, there is a need in the art for novel methods of manipulating droplet frequency of generation, frequency of library droplet introduction and droplet volume.

Combinations of surfactant(s) and oils must be developed to facilitate generation, storage, and manipulation of droplets to maintain the unique chemical/biochemical/biological environment within each droplet of a diverse library. Therefore, the surfactant and oil combination must (1) stabilize droplets against uncontrolled coalescence during the drop forming process and subsequent collection and storage, (2) minimize transport of any droplet contents to the oil phase and/or between droplets, and (3) maintain chemical and biological inertness with contents of each droplet (e.g., no adsorption or reaction of encapsulated contents at the oil-water interface, and no adverse effects on biological or chemical constituents in the droplets). In addition to the requirements on the droplet library function and stability, the surfactant-in-oil solution must be coupled with the fluid physics and materials associated with the platform. Specifically, the oil solution must not swell, dissolve, or degrade the materials used to construct the microfluidic chip, and the physical properties of the oil (e.g., viscosity, boiling point, etc.) must be suited for the flow and operating conditions of the platform.

Droplets formed in oil without surfactant are not stable to permit coalescence, so surfactants must be dissolved in the fluorous oil that is used as the continuous phase for the emulsion library. Surfactant molecules are amphiphilic—part of the molecule is oil soluble, and part of the molecule is water soluble. When a water-oil interface is formed at the nozzle of a microfluidic chip for example in the inlet module described herein, surfactant molecules that are dissolved in the oil phase adsorb to the interface. The hydrophilic portion of the molecule resides inside the droplet and the fluorophilic portion of the molecule decorates the exterior of the droplet. The surface tension of a droplet is reduced when the interface is populated with surfactant, so the stability of an emulsion is improved. In addition to stabilizing the droplets against coalescence, the surfactant should be inert to the contents of each droplet and the surfactant should not promote transport of encapsulated components to the oil or other droplets.

A droplet library may be made up of a number of library elements that are pooled together in a single collection (see, e.g., US Patent Publication No. 2010002241). Libraries may vary in complexity from a single library element to $10^{15}$ library elements or more. Each library element may be one or more given components at a fixed concentration. The element may be, but is not limited to, cells, virus, bacteria, yeast, beads, amino acids, proteins, polypeptides, nucleic acids, polynucleotides or small molecule chemical compounds. The element may contain an identifier such as a label. The terms "droplet library" or "droplet libraries" are also referred to herein as an "emulsion library" or "emulsion libraries." These terms are used interchangeably throughout the specification.

A cell library element may include, but is not limited to, hybridomas, B-cells, primary cells, cultured cell lines, cancer cells, stem cells, or any other cell type. Cellular library elements are prepared by encapsulating a number of cells from one to tens of thousands in individual droplets. The number of cells encapsulated is usually given by Poisson statistics from the number density of cells and volume of the droplet. However, in some cases the number deviates from Poisson statistics as described in Edd et al., "Controlled encapsulation of single-cells into monodisperse picolitre drops." Lab Chip, 8(8): 1262-1264, 2008. The discreet nature of cells allows for libraries to be prepared in mass with a plurality of cellular variants all present in a single starting media and then that media is broken up into individual droplet capsules that contain at most one cell. These individual droplets capsules are then combined or pooled to form a library consisting of unique library elements. Cell division subsequent to, or in some embodiments following, encapsulation produces a clonal library element.

A bead based library element may contain one or more beads, of a given type and may also contain other reagents, such as antibodies, enzymes or other proteins. In the case where all library elements contain different types of beads, but the same surrounding media, the library elements may all be prepared from a single starting fluid or have a variety of starting fluids. In the case of cellular libraries prepared in mass from a collection of variants, such as genomically modified, yeast or bacteria cells, the library elements will be prepared from a variety of starting fluids.

Often it is desirable to have exactly one cell per droplet with only a few droplets containing more than one cell when starting with a plurality of cells or yeast or bacteria, engineered to produce variants on a protein. In some cases, variations from Poisson statistics may be achieved to provide an enhanced loading of droplets such that there are more droplets with exactly one cell per droplet and few exceptions of empty droplets or droplets containing more than one cell.

Examples of droplet libraries are collections of droplets that have different contents, ranging from beads, cells, small molecules, DNA, primers, antibodies. Smaller droplets may be in the order of femtoliter (fL) volume drops, which are especially contemplated with the droplet dispensers. The volume may range from about 5 to about 600 fL. The larger droplets range in size from roughly 0.5 micron to 500 micron in diameter, which corresponds to about 1 pico liter to 1 nano liter. However, droplets may be as small as 5 microns and as large as 500 microns. Preferably, the droplets are at less than 100 microns, about 1 micron to about 100 microns in diameter. The most preferred size is about 20 to 40 microns in diameter (10 to 100 picoliters). The preferred properties examined of droplet libraries include osmotic pressure balance, uniform size, and size ranges.

The droplets within the droplet library provided by the instant invention may be uniform in size. That is, the diameter of any droplet within the library will vary less than 5%, 4%. 3%, 2%, 1% or 0.5% when compared to the diameter of other droplets within the same library. The uniform size of the droplets in the library is critical to maintain the stability and integrity of the droplets and is also essential for the subsequent use of the droplets within the library for the various biological and chemical assays described herein.

The droplets comprised within the emulsion libraries of the present invention may be contained within an immiscible fluorocarbon oil which may comprise at least one fluorosurfactant. In some embodiments, the fluorosurfactant comprised within immiscible fluorocarbon oil is a block copolymer consisting of one or more perfluorinated polyether (PFPE) blocks and one or more polyethylene glycol (PEG) blocks. In other embodiments, the fluorosurfactant is a triblock copolymer consisting of a PEG center block covalently bound to two PFPE blocks by amide linking groups. The presence of the fluorosurfactant (similar to uniform size of the droplets in the library) is critical to maintain the stability and integrity of the droplets and is also essential for the subsequent use of the droplets within the library for the various biological and chemical assays described herein. Fluids (e.g., aqueous fluids, immiscible oils, etc.) and other surfactants that may be utilized in the droplet libraries of the present invention are described in greater detail herein.

The droplet libraries of the present invention are very stable and are capable of long-term storage. The droplet libraries are determined to be stable if the droplets comprised within the libraries maintain their structural integrity, that is the droplets do not rupture and elements do not diffuse from the droplets. The droplets libraries are also determined to be stable if the droplets comprised within the libraries do not coalesce spontaneously (without additional energy input, such as electrical fields described in detail herein). Stability may be measured at any temperature. For example, the droplets are very stable and are capable of long-term storage at any temperature; for example, e.g., −70° C., 0° C., 4° C., 37° C., room temperature, 75° C. and 95° C. Specifically, the droplet libraries of the present invention are stable for at least 30 days. More preferably, the droplets are stable for at least 60 days. Most preferably, the droplets are stable for at least 90 days.

The present invention provides an emulsion library which may comprise a plurality of aqueous droplets within an immiscible fluorocarbon oil which may comprise at least one fluorosurfactant, wherein each droplet is uniform in size and may comprise the same aqueous fluid and may comprise a different library element. The present invention also provides a method for forming the emulsion library which may comprise providing a single aqueous fluid which may comprise different library elements, encapsulating each library element into an aqueous droplet within an immiscible fluorocarbon oil which may comprise at least one fluorosurfactant, wherein each droplet is uniform in size and may comprise the same aqueous fluid and may comprise a different library element, and pooling the aqueous droplets within an immiscible fluorocarbon oil which may comprise at least one fluorosurfactant, thereby forming an emulsion library.

For example, in one type of emulsion library, all different types of elements (e.g., cells or beads), may be pooled in a single source contained in the same medium. After the initial pooling, the cells or beads are then encapsulated in droplets to generate a library of droplets wherein each droplet with a different type of bead or cell is a different library element. The dilution of the initial solution enables the encapsulation process. In some embodiments, the droplets formed will either contain a single cell or bead or will not contain anything, i.e., be empty. In other embodiments, the droplets formed will contain multiple copies of a library element. The cells or beads being encapsulated are generally variants on the same type of cell or bead. In one example, the cells may comprise cancer cells of a tissue biopsy, and each cell type is encapsulated to be screened for genomic data or against different drug therapies. Another example is that $10^{11}$ or $10^{15}$ different type of bacteria; each having a different plasmid spliced therein, are encapsulated. One example is a bacterial library where each library element grows into a clonal population that secretes a variant on an enzyme.

In another example, the emulsion library may comprise a plurality of aqueous droplets within an immiscible fluorocarbon oil, wherein a single molecule may be encapsulated, such that there is a single molecule contained within a droplet for every 20-60 droplets produced (e.g., 20, 25, 30, 35, 40, 45, 50, 55, 60 droplets, or any integer in between). Single molecules may be encapsulated by diluting the solution containing the molecules to such a low concentration that the encapsulation of single molecules is enabled. In one specific example, a LacZ plasmid DNA was encapsulated at a concentration of 20 fM after two hours of incubation such that there was about one gene in 40 droplets, where 10 µm droplets were made at 10 kHz per second. Formation of these libraries rely on limiting dilutions.

The present invention also provides an emulsion library which may comprise at least a first aqueous droplet and at least a second aqueous droplet within a fluorocarbon oil which may comprise at least one fluorosurfactant, wherein the at least first and the at least second droplets are uniform in size and comprise a different aqueous fluid and a different library element. The present invention also provides a method for forming the emulsion library which may comprise providing at least a first aqueous fluid which may comprise at least a first library of elements, providing at least a second aqueous fluid which may comprise at least a second library of elements, encapsulating each element of said at least first library into at least a first aqueous droplet within an immiscible fluorocarbon oil which may comprise at least one fluorosurfactant, encapsulating each element of said at least second library into at least a second aqueous droplet within an immiscible fluorocarbon oil which may comprise at least one fluorosurfactant, wherein the at least first and the at least second droplets are uniform in size and comprise a different aqueous fluid and a different library element, and pooling the at least first aqueous droplet and the at least second aqueous droplet within an immiscible fluorocarbon oil which may comprise at least one fluorosurfactant thereby forming an emulsion library.

One of skill in the art will recognize that methods and systems of the invention are not limited to any particular type of sample, and methods and systems of the invention may be used with any type of organic, inorganic, or biological molecule (see, e.g, US Patent Publication No. 20120122714). In particular embodiments the sample may include nucleic acid target molecules. Nucleic acid molecules may be synthetic or derived from naturally occurring sources. In one embodiment, nucleic acid molecules may be isolated from a biological sample containing a variety of other components, such as proteins, lipids and non-template nucleic acids. Nucleic acid target molecules may be obtained from any cellular material, obtained from an animal, plant, bacterium, fungus, or any other cellular organism. In certain embodiments, the nucleic acid target molecules may be obtained from a single cell. Biological samples for use in the present invention may include viral particles or preparations. Nucleic acid target molecules may be obtained directly from an organism or from a biological sample obtained from an organism, e.g., from blood, urine, cerebrospinal fluid, seminal fluid, saliva, sputum, stool and tissue. Any tissue or body fluid specimen may be used as a source for nucleic acid for use in the invention. Nucleic acid target molecules may also be isolated from cultured cells, such as a primary cell culture or a cell line. The cells or tissues from which target nucleic acids are obtained may be infected with a virus or other intracellular pathogen. A sample may also be total RNA extracted from a biological specimen, a cDNA library, viral, or genomic DNA.

Generally, nucleic acid may be extracted from a biological sample by a variety of techniques such as those described by Maniatis, et al., Molecular Cloning: A Laboratory Manual, Cold Spring Harbor, N.Y., pp. 280-281 (1982). Nucleic acid molecules may be single-stranded, double-stranded, or double-stranded with single-stranded regions (for example, stem- and loop-structures).

Nucleic acid obtained from biological samples typically may be fragmented to produce suitable fragments for analysis. Target nucleic acids may be fragmented or sheared to desired length, using a variety of mechanical, chemical and/or enzymatic methods. DNA may be randomly sheared via sonication, e.g. Covaris method, brief exposure to a DNase, or using a mixture of one or more restriction enzymes, or a transposase or nicking enzyme. RNA may be fragmented by brief exposure to an RNase, heat plus magnesium, or by shearing. The RNA may be converted to cDNA. If fragmentation is employed, the RNA may be converted to cDNA before or after fragmentation. In one embodiment, nucleic acid from a biological sample is fragmented by sonication. In another embodiment, nucleic acid is fragmented by a hydroshear instrument. Generally, individual nucleic acid target molecules may be from about 40 bases to about 40 kb. Nucleic acid molecules may be single-stranded, double-stranded, or double-stranded with single-stranded regions (for example, stem- and loop-structures).

A biological sample as described herein may be homogenized or fractionated in the presence of a detergent or surfactant. The concentration of the detergent in the buffer may be about 0.05% to about 10.0%. The concentration of the detergent may be up to an amount where the detergent remains soluble in the solution. In one embodiment, the concentration of the detergent is between 0.1% to about 2%. The detergent, particularly a mild one that is nondenaturing, may act to solubilize the sample. Detergents may be ionic or nonionic. Examples of nonionic detergents include triton, such as the Triton™ X series (Triton™ X-100 t-Oct-$C_6H4$—($OCH_2$—$CH_2$)$_x$OH, x=9-10, Triton™ X-100R, Triton™ X-114 x=7-8), octyl glucoside, polyoxyethylene(9)dodecyl ether, digitonin, IGEPAL™ CA630 octylphenyl polyethylene glycol, n-octyl-beta-D-glucopyranoside (betaOG), n-dodecyl-beta, Tween™. 20 polyethylene glycol sorbitan monolaurate, Tween™ 80 polyethylene glycol sorbitan monooleate, polidocanol, n-dodecyl beta-D-maltoside (DDM), NP-40 nonylphenyl polyethylene glycol, C12E8 (octaethylene glycol n-dodecyl monoether), hexaethyleneglycol mono-n-tetradecyl ether (C14E06), octyl-beta-thioglucopyranoside (octyl thioglucoside, OTG), Emulgen, and polyoxyethylene 10 lauryl ether (C12E10). Examples of ionic detergents (anionic or cationic) include deoxycholate, sodium dodecyl sulfate (SDS), N-lauroylsarcosine, and cetyltrimethylammoniumbromide (CTAB). A zwitterionic reagent may also be used in the purification schemes of the present invention, such as Chaps, zwitterion 3-14, and 3-[(3-cholamidopropyl)dimethylammonio]-1-propanesulfonate. It is contemplated also that urea may be added with or without another detergent or surfactant.

Lysis or homogenization solutions may further contain other agents, such as reducing agents. Examples of such reducing agents include dithiothreitol (DTT), β-mercaptoethanol, DTE, GSH, cysteine, cysteamine, tricarboxyethyl phosphine (TCEP), or salts of sulfurous acid.

Size selection of the nucleic acids may be performed to remove very short fragments or very long fragments. The nucleic acid fragments may be partitioned into fractions which may comprise a desired number of fragments using any suitable method known in the art. Suitable methods to limit the fragment size in each fragment are known in the art. In various embodiments of the invention, the fragment size is limited to between about 10 and about 100 Kb or longer.

In another embodiment, the sample includes individual target proteins, protein complexes, proteins with translational modifications, and protein/nucleic acid complexes. Protein targets include peptides, and also include enzymes, hormones, structural components such as viral capsid proteins, and antibodies. Protein targets may be synthetic or derived from naturally-occurring sources. In one embodiment of the invention protein targets are isolated from biological samples containing a variety of other components including lipids, non-template nucleic acids, and nucleic acids. In certain embodiments, protein targets may be obtained from an animal, bacterium, fungus, cellular organism, and single cells. Protein targets may be obtained directly from an organism or from a biological sample obtained from the organism, including bodily fluids such as blood, urine, cerebrospinal fluid, seminal fluid, saliva, sputum, stool and tissue. Protein targets may also be obtained from cell and tissue lysates and biochemical fractions. An individual protein is an isolated polypeptide chain. A protein complex includes two or polypeptide chains. Samples may include proteins with post translational modifications including but not limited to phosphorylation, methionine oxidation, deamidation, glycosylation, ubiquitination, carbamylation, s-carboxymethylation, acetylation, and methylation. Protein/nucleic acid complexes include cross-linked or stable protein-nucleic acid complexes.

Extraction or isolation of individual proteins, protein complexes, proteins with translational modifications, and protein/nucleic acid complexes is performed using methods known in the art.

Methods of the invention involve forming sample droplets. The droplets are aqueous droplets that are surrounded by an immiscible carrier fluid. Methods of forming such droplets are shown for example in Link et al. (U.S. patent application numbers 2008/0014589, 2008/0003142, and 2010/0137163), Stone et al. (U.S. Pat. No. 7,708,949 and U.S. patent application number 2010/0172803), Anderson et al. (U.S. Pat. No. 7,041,481 and which reissued as RE41, 780) and European publication number EP2047910 to Raindance Technologies Inc. The content of each of which is incorporated by reference herein in its entirety.

Figure 1:
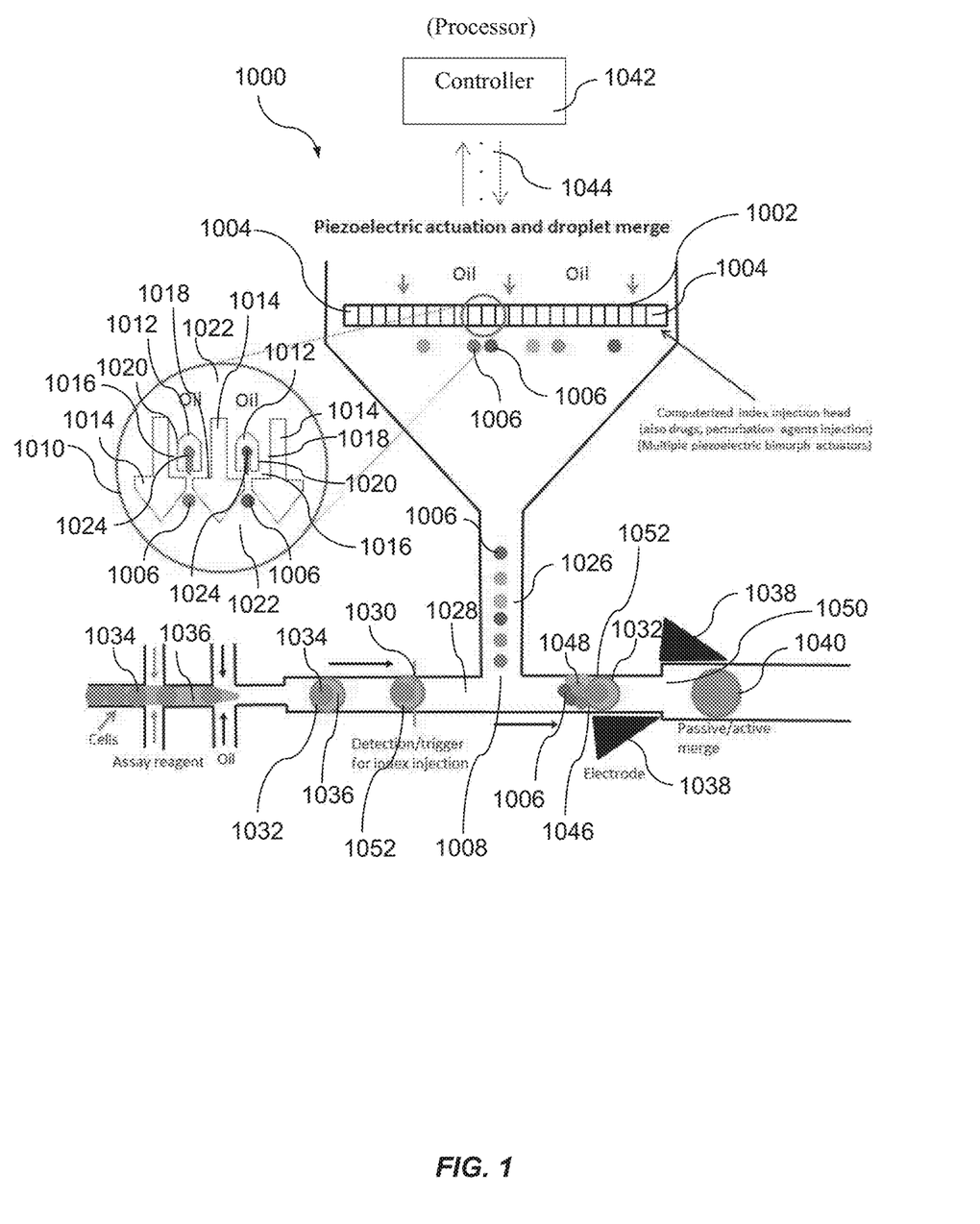
FIG. 1 illustrates a reagent delivery system according to an exemplary disclosed embodiment.

The present invention relates to systems and methods for manipulating droplets within a high through put microfluidic system. Turning to FIG. 1, the aforementioned microfluidic system is regarded as the reagent delivery system 1000 or microfluidic library printer or droplet library printing system of the present invention. Reagent delivery system 1000 provides an on demand feature to precisely and quickly group and combine droplets 1006. Dynamic reagent delivery system 1000 is illustrated capable of creating a library of emulsion outlooks via a fluidic system. Reagent delivery system 1000 may include a printing array 1002 of droplet generators 1004 disposed within the system to release one or more reagents as described herein. Droplets 1006 are formed as sample fluid flows from droplet generator 1004 through microfluidic outlet channel 1012 towards junction 1008.

In a further embodiment, the droplet generators 1004, are replaced by droplet dispensers. Each droplet dispenser is loaded with a reagent emulsion comprising pre-formed droplets containing reagents. Defined volumes of loaded reagent emulsion, corresponding to defined numbers of droplets, are dispensed on-demand into the flow stream of carrier fluid. In this embodiment, the droplets in the emulsion loaded in each droplet dispenser may either all contain the same reagent(s), or two or more species of droplets containing different reagents may be loaded in each droplet dispenser. In the latter case, if the number of droplet species is much larger than the number of droplets dispensed in a single injection, the combination of droplet species dispensed from the same droplet dispenser with each injection is different. This allows different emulsion droplets to receive different codes by fusion with reagent droplets from the same droplet dispenser. In a select embodiment, reagent droplets are dispensed using a piezo electric actuator.

The droplets in the emulsion loaded in each droplet dispenser may either all contain the same reagent(s), or two or more species of droplets containing different reagents may be loaded in each droplet dispenser. In the latter case, if the number of droplet species is much larger than the number of droplets dispensed in a single injection, the combination of droplet species dispensed from the same droplet dispenser with each injection is different. This allows different emulsion droplets to receive different codes by fusion with reagent droplets from the same droplet dispenser.

The sample fluid may typically comprise an aqueous buffer solution, such as ultrapure water (e.g., 18 mega-ohm resistivity, obtained, for example by column chromatography), 10 mM Tris HCl and 1 mM EDTA (TE) buffer, phosphate buffer saline (PBS) or acetate buffer. Any liquid or buffer that is physiologically compatible with nucleic acid molecules can be used. The carrier fluid may include one that is immiscible with the sample fluid. The carrier fluid can be a non-polar solvent, decane (e.g., tetradecane or hexadecane), fluorocarbon oil, silicone oil, an inert oil such as hydrocarbon, or another oil (for example, mineral oil).

In certain embodiments, the carrier fluid may contain one or more additives, such as agents which reduce surface tensions (surfactants). Surfactants can include Tween, Span, fluorosurfactants, and other agents that are soluble in oil relative to water. In some applications, performance is improved by adding a second surfactant to the sample fluid. Surfactants can aid in controlling or optimizing droplet size, flow and uniformity, for example by reducing the shear force needed to extrude or inject droplets into an intersecting channel. This can affect droplet volume and periodicity, or the rate or frequency at which droplets break off into an intersecting channel. Furthermore, the surfactant can serve to stabilize aqueous emulsions in fluorinated oils from coalescing.

In certain embodiments, the droplets may be surround by a surfactant which stabilizes the droplets by reducing the surface tension at the aqueous oil interface. Preferred surfactants that may be added to the carrier fluid include, but are not limited to, surfactants such as sorbitan-based carboxylic acid esters (e.g., the "Span" surfactants. Fluka Chemika), including sorbitan monolaurate (Span 20), sorbitan monopalmitate (Span 40), sorbitan monostearate (Span 60) and sorbitan monooleate (Span 80), and perfluorinated polyethers (e.g., DuPont Krytox 157 FSL, FSM, and/or FSH). Other non-limiting examples of non-ionic surfactants which may be used include polyoxyethylenated alkylphenols (for example, nonyl-, p-dodecyl-, and dinonylphenols), polyoxyethylenated straight chain alcohols, polyoxyethylenated polyoxypropylene glycols, polyoxyethylenated mercaptans, long chain carboxylic acid esters (for example, glyceryl and polyglyceryl esters of natural fatty acids, propylene glycol, sorbitol, polyoxyethylenated sorbitol esters, polyoxyethylene glycol esters, etc.) and alkanolamines (e.g., diethanolamine-fatty acid condensates and isopropanolamine-fatty acid condensates).

In certain embodiments, the carrier fluid may be caused to flow through the outlet channel so that the surfactant in the carrier fluid coats the channel walls. In one embodiment, the fluorosurfactant can be prepared by reacting the perflourinated polyether DuPont Krytox 157 FSL, FSM, or FSH with aqueous ammonium hydroxide in a volatile fluorinated solvent. The solvent and residual water and ammonia can be removed with a rotary evaporator. The surfactant can then be dissolved (e.g., 2.5 wt %) in a fluorinated oil (e.g., Flourinert (3M)), which then serves as the carrier fluid.

The enlargement 1010 of a portion of printing array 1002 illustrates respective sample fluid reservoirs 1012 disposed within the array structure 1014. Passageways 1016 are formed between the exterior 1018 of array structure 1014 and the exterior structure 1020 of sample fluid reservoirs 1012. Passageways 1016 channel carrier fluid 1022 therethrough as outlined below. Sample fluid reservoirs 1012 may function as a series of discrete reservoirs, each of which may contain the same or a different sample fluid or reagent 1024. Reagent droplets 1006 are formed from fluid reservoirs 1012 and dispensed into carrier fluid 1022.

Activation of sample fluid reservoirs 1012 to produce regent droplets 1006 is now described. The disclosed invention is based on the concept of dynamic reagent delivery (e.g., combinatorial barcoding) via an on demand capability. The on demand feature may be provided by one of a variety of technical capabilities for releasing delivery droplets to a primary droplet, as described herein. One disclosed embodiment of the present invention provides the concept of dynamic reagent delivery (e.g., combinatorial barcoding) as delivered by a controlled actuator (e.g., piezoelectric actuation or picoinjection). Regardless of method, multiple actuators can be incorporated into a chip design to provide the on demand capability. Instead of continuously generating a train of droplets by hydrodynamic focusing at a nozzle or T-junction in a microfluidic channel, there are many advantages for reliably generating a droplet or injecting a precise amount of a fluid on demand. In accordance with one disclosed embodiment, a mechanism for the method described herein is based on computerized activation of a piezoelectric actuator to dispense a picoliter volume of a fluid.

Figures 2A, 2B:
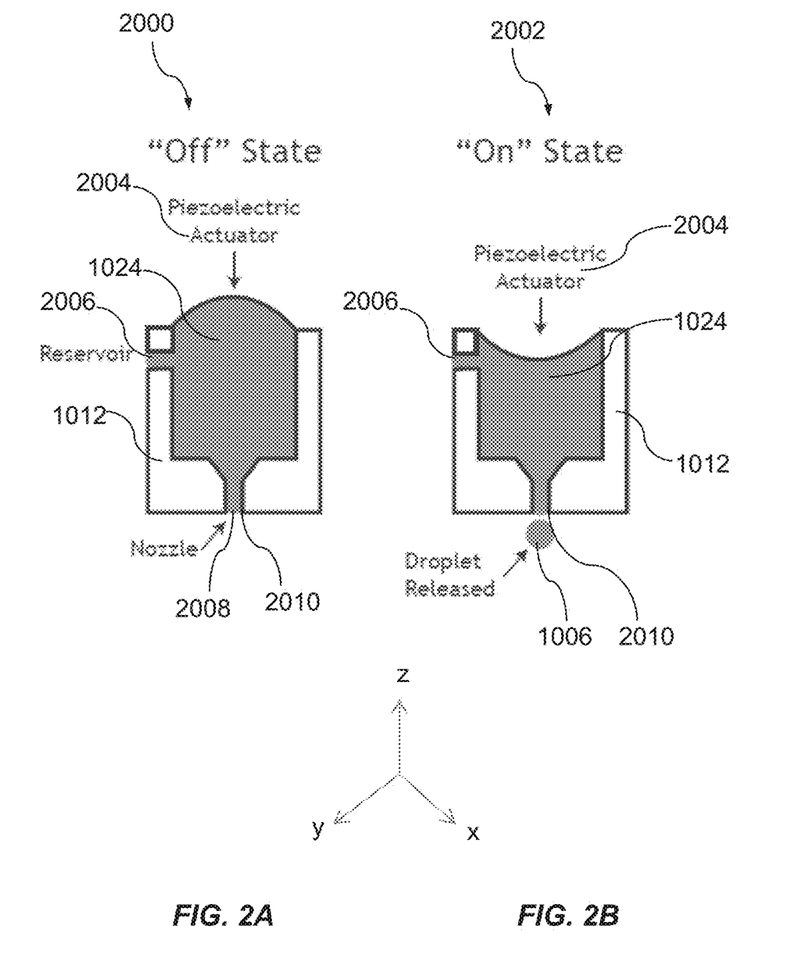
FIGS. 2A and 2B illustrate a dual state mode of a component of a reagent delivery system according to an exemplary disclosed embodiment.
Figure 3:
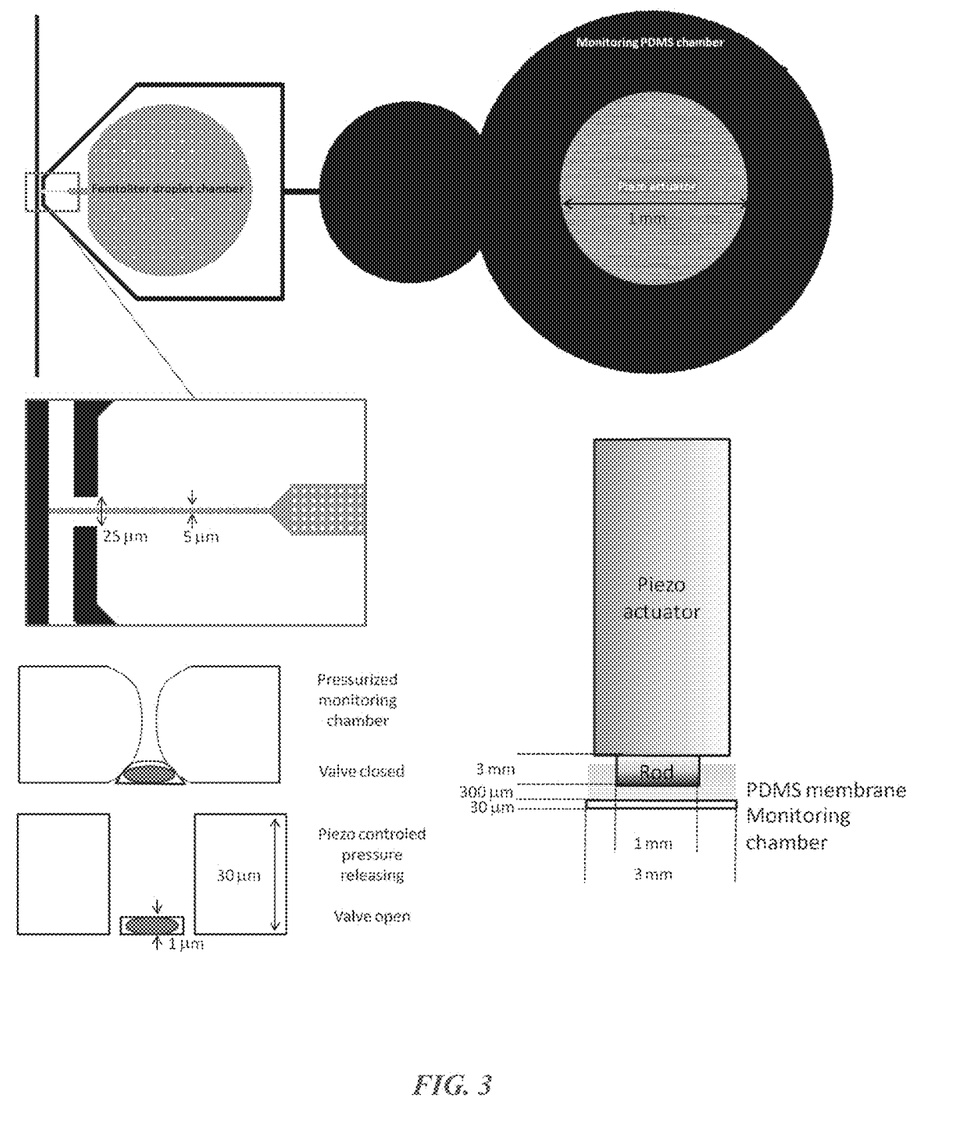
FIG. 3 illustrates a reagent delivery system according to an exemplary disclosed embodiment of Example 1.

Turning to FIGS. 2A and 2B, a disclosed embodiment of sample fluid reservoir 1012 is illustrated in an "off" state position 2000 and an "on" state position 2002, respectively. A supply of sample fluid may be coupled to an inlet channel 2006 of sample fluid reservoir 1012. A series of discrete sample fluid reservoirs 1012 (each of which can contain a different reagent 1024) are connected to a series of discrete piezoelectric actuators 2004 such that each actuator 2004 delivers a specific reagent 1024. Upon activation of piezoelectric actuator 2004, a displaced volume of reagent 1024 is dispensed from the nozzle 2008 and through the outlet channel 2010 thereby releasing a reagent droplet 1006. In a preferred embodiment, fluid reservoirs may be arranged within the printer array 1002 assembly such that it releases reagent droplet 1006 in a z-direction into a fluid flow (e.g., carrier oil) flowing parallel in a plane with the x and y direction. The aforementioned flow stream is, therefore, generally perpendicular or orthogonal to the release or z-direction of reagent droplet 1006. The piezoelectric actuators 2004 may be independently controlled via a computer program to deliver a set volume of reagent 1024 from each actuator 2004 such that one or more specific actuators 2004 can be simultaneously turned "on" in order to deliver a specific reagent or combination of reagents into the carrier flow stream.

Turning, again, to FIG. 1, as reagent droplets 1006 are formed, they are released into the flow stream of carrier fluid 1022. The shear force of the carrier fluid flow stream shears off reagent droplets 1006 into carrier fluid 1022. The flow rate of the carrier fluid 1022 may impact the size of reagent droplets 1006 to a degree. When the flow rate of the carrier fluid 1022 is low, the shear force is low and, hence, more volume of the reagent droplet 1006 is allowed to form before it is sheared off into the flow stream of carrier fluid 1022. Thus, in this manner, more concentration/volume of the respective reagent droplet 1006 is encountered within the flow stream of carrier fluid 1022. Alternatively, when the flow rate of the carrier fluid 1022 is high, the shear force will be high and, hence, less volume of the reagent droplet 1006 is allowed to form before it is sheared off into the flow stream of carrier fluid 1022. Thus, in this manner, less concentration/volume of the respective reagent droplet 1006 is encountered within the flow stream of carrier fluid 1022.

In select embodiments, the flow rate of the carrier fluid 1022 may be precisely adjusted and controlled by the feedback control system 1044 of the disclosed embodiment. This may include the monitoring and control of reagent delivery system 1000 including a programmed sequence controlled, for example, by any one of microprocessors and/or processors that can regulate a controller 1042 as part of a computer or computerized system.

The system, as described in the present technique or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present technique.

The computer system comprises a computer, an input device, a display unit and/or the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present technique. The set of instructions may be in the form of a software program. Further, the software may be in the form of a collection of separate programs, a program module with a larger program or a portion of a program module, as in the present technique. The software may also include modular programming in the form of object-oriented programming. The processing of input data by the processing machine may be in response to user commands, results of previous processing or a request made by another processing machine.

Reagent droplets 1006 released by printing array 1002 travel together through a microfluidic channel 1026. Microfluidic channel 1026 may be regarded as a focusing channel and carries reagent droplets 1006 to join with a separate microfluidic flow channel or cross-channel 1028 at a junction point 1008. In select embodiments, junction point 1008 may comprise a 'T' junction. Importantly, the timing of the release of reagent droplets 1006 from piezoelectric printing array 1002 is controlled by a "detector/trigger" device 1030 located orthogonal to microfluidic channel 1026 and within microfluidic cross-channel 1028 as described below. In a disclosed example, a series of emulsion droplets 1032 may be prepared in the orthogonal cross-channel 1028, for example, using standard flow focusing techniques. This process occurs upstream to junction 1008. Each emulsion droplet 1032 created by the present flow focusing device can be thought of as a single reaction chamber. The "reaction chamber" droplet 1032 may contain a cell 1034, assay substrate 1036, etc. As each "reaction chamber" droplet 1032 passes through detector 1030, a signal is sent to piezoelectric printing array 1002 to release a specified set of reagent droplets 1006. The design of the disclosed device is such that reagent droplets 1006 delivered by piezoelectric printing array 1002 arrive at junction 1008 to precisely encounter "reaction chamber" droplet 1032. Downstream to junction 1008 reagent droplets 1006 and "reaction chamber" droplet 1032 travel in direct proximity to each other. Reagent delivery system 1000 provides a merging feature to merge reagent droplets 1006 with "reaction chamber" droplet 1032. In one disclosed embodiment, the merging feature may comprise an electrode assembly 1038, however it will be readily appreciated by those skilled in the art that any technical feature suitable for merging reagent droplets with cell assemblies may be utilized (e.g., passive/active merging techniques). Once merging is complete a fully treated/merged cell is produced for analysis and/or testing.

Thus, an important aspect in developing this device will be to determine the flow rates, channel lengths, channel geometries, etc. that are required to properly time the arrival of the reagents released from the piezoelectric array with the "reaction chamber" droplets travelling in the orthogonal microfluidic channel. Once these design specifications are established, droplets containing random or specified reagent combinations can be generated on demand and merged with the "reaction chamber" droplets containing the samples/cells/substrates of interest.

Accordingly, in the disclosed embodiment a target droplet such as emulsion droplet 1032 may be detected within cross-channel 1028. In one embodiment, the detection may occur via "detector/trigger" device 1030 which may, for example, include sensors having one or a plurality of detection means such as via optical, electrical, or pressure relay. Hence, upon detection of the target droplet by the sensor, a feedback control system 1044 computes the timed release of droplets 1006 from printing array 1002 to coincide with arrival with the target droplet 1036 in the perpendicular channel 1028. The printed or reagent droplets 1006 may arrive behind (e.g., see location 1046) the target droplet 1032 and, due to their smaller size, catch up to the larger droplet 1032 where passive or active merge systems may coalesce them into a single droplet 1040. The feedback system 1044 is able to adjust flowrates in each of the channels 1026, 1028 to determine the timing between detection of a target droplet 1032 and the printed droplets 1006 and continuously adjust both the flowrates and the timing of release to ensure synchronization between the target and printed droplets 1032 and 1006, respectively. Sensors may also measure the release of the printed droplets 1006 to ensure full synchronization of the droplet release and arrival. Additionally for situations where multiple droplets of a given concentration need to be released, the reagent delivery system 1000 will adjust the timing to ensure arrival of multiple droplets 1006. The presently described feedback loop system provides facilitates the on demand capability of the disclosed reagent delivery system 1000.

Thus, the present invention provides systems and methods for manipulating droplets 1006 within a high through put microfluidic system. Reagent delivery system 1000 provides an on demand feature to precisely and quickly group and combine droplets 1006. As shown in the example of FIG. 1, a primary droplet 1052, such as one containing cell 1034 as depicted here, encounters and is fused with one or more additional droplets 1006 that are delivered on demand via focusing channel 1026 that groups the additional droplets 1006 into a set of droplets 1048 that merge into flow channel 1028 with and behind the primary droplet 1052 such that the set of droplets 1048 merge with and combine to become part of a slightly enlarged primary droplet 1040, possibly with introduction of additional manipulation such as agitation.

As shown in this example, with delivery of the additional droplet or droplets 1006 on demand, each set may contain one or more droplets 1006 for each condition or reagent to be combined into the droplet. For example, a reagent may be a chemical reagent (biologic or non-biologic, organic or inorganic), a protein, a drug, or an antibody, an enzyme, a biological (such as, but not limited to, a cell, microbiome or a virus) and the like.

By using the droplet on demand system of the present invention, particularly one having a piezoelectric or actuator or other means to precisely control and quickly deliver small volumes of fluid, the set of additional droplets can contain multiple identical additional droplets 1006 to allow high throughput study of a single reagent (such as a drug) across a variety of conditions (such as concentration) and in various combinations (represented by different colors) also under a variety of conditions (such as multiple combinations of concentrations). In a preferred embodiment, the primary flow channel 1028 may include an enlarged section 1050, for example, just post delivery of the set of droplets 1048 to slow the rate of the primary droplet 1052 using flow dynamics to ensure complete combination of the set of additional droplets 1048 with the primary droplet 1052. See also US Patent Publication No. 20120236299.

By incorporating a plurality of unique tags into the additional droplets 1006 and joining the tags to a solid support designed to be specific to the primary droplet 1052, the conditions that the primary droplet 1052 is exposed to may be encoded and recorded. For example, nucleic acid tags can be sequentially ligated to create a sequence reflecting conditions and order of same. Alternatively, the tags can be added independently appended to solid support. Non-limiting examples of a dynamic labeling system that may be used to bioninformatically record information can be found at US Provisional Patent Application entitled "Compositions and Methods for Unique Labeling of Agents" filed Sep. 21, 2012 and Nov. 29, 2012. In this way, two or more droplets may be exposed to a variety of different conditions, where each time a droplet is exposed to a condition, a nucleic acid encoding the condition is added to the droplet each ligated together or to a unique solid support associated with the droplet such that, even if the droplets with different histories are later combined, the conditions of each of the droplets are remain available through the different nucleic acids. Non-limiting examples of methods to evaluate response to exposure to a plurality of conditions can be found at US Provisional Patent Application entitled "Systems and Methods for Droplet Tagging" filed Sep. 21, 2012.

Reagent delivery system 1000 enables the encoding of a number of different barcoding systems. In its simplest implementation the encoding may be binary such that the release of a particular combination of oligos from the printing units encodes base 2 codes, where for example if 10 printing units exist, it is be possible to encode the combination of 1010101010 with appropriately designed oligos such that the presence and absence of oligos could be detected enabling an encoding capacity of $2^{10}$ or 1,024 unique combinations. The number of print units may be expanded to increase the number of unique barcodes. Alternatively, multiple printing units may be designed to operate in series, for example 4, such that for each position 4 different oligo combinations could be produced then the encoding capacity is $4^{10}$ combinations are possible.

Applications of the disclosed device may include use for the dynamic generation of molecular barcodes (e.g., DNA oligonucleotides, flurophores, etc.) either independent from or in concert with the controlled delivery of various compounds of interest (drugs, small molecules, siRNA, reagents, etc.). For example, unique molecular barcodes can be created in one array of nozzles while individual compounds or combinations of compounds can be generated by another nozzle array. Barcodes/compounds of interest can then be merged with cell-containing droplets. An electronic record in the form of a computer log file is kept to associate the barcode delivered with the downstream reagent(s) delivered. This methodology makes it possible to efficiently screen a large population of cells for applications such as single-cell drug screening, controlled perturbation of regulatory pathways, etc. The device and techniques of the disclosed invention facilitate efforts to perform studies that require data resolution at the single cell (or single molecule) level and in a cost effective manner. Disclosed embodiments provide a high throughput and high resolution delivery of reagents to individual emulsion droplets that may contain cells, nucleic acids, proteins, etc. through the use of monodisperse aqueous droplets that are generated one by one in a microfluidic chip as a water-in-oil emulsion. Hence, the invention proves advantageous over prior art systems by being able to dynamically track individual cells and droplet treatments/combinations during life cycle experiments. Additional advantages of the disclosed invention provides an ability to create a library of emulsion droplets on demand with the further capability of manipulating the droplets through the disclosed process(es). Disclosed embodiments may, thereby, provide dynamic tracking of the droplets and create a history of droplet deployment and application in a single cell based environment.

Droplet generation and deployment is produced via a dynamic indexing strategy and in a controlled fashion in accordance with disclosed embodiments of the present invention. Disclosed embodiments of the microfluidic device described herein provides the capability of microdroplets that be processed, analyzed and sorted at a highly efficient rate of several thousand droplets per second, providing a powerful platform which allows rapid screening of millions of distinct compounds, biological probes, proteins or cells either in cellular models of biological mechanisms of disease, or in biochemical, or pharmacological assays.

A plurality of biological assays as well as biological synthesis are contemplated for the present invention.

In an advantageous embodiment, polymerase chain reactions (PCR) are contemplated (see, e.g., US Patent Publication No. 20120219947). Methods of the invention may be used for merging sample fluids for conducting any type of chemical reaction or any type of biological assay. In certain embodiments, methods of the invention are used for merging sample fluids for conducting an amplification reaction in a droplet. Amplification refers to production of additional copies of a nucleic acid sequence and is generally carried out using polymerase chain reaction or other technologies well known in the art (e.g., Dieffenbach and Dveksler, PCR Primer, a Laboratory Manual, Cold Spring Harbor Press, Plainview, N.Y. [1995]). The amplification reaction may be any amplification reaction known in the art that amplifies nucleic acid molecules, such as polymerase chain reaction, nested polymerase chain reaction, polymerase chain reaction-single strand conformation polymorphism, ligase chain reaction (Barany F. (1991) PNAS 88:189-193; Barany F. (1991) PCR Methods and Applications 1:5-16), ligase detection reaction (Barany F. (1991) PNAS 88:189-193), strand displacement amplification and restriction fragments length polymorphism, transcription based amplification system, nucleic acid sequence-based amplification, rolling circle amplification, and hyper-branched rolling circle amplification.

In certain embodiments, the amplification reaction is the polymerase chain reaction. Polymerase chain reaction (PCR) refers to methods by K. B. Mullis (U.S. Pat. Nos. 4,683,195 and 4,683,202, hereby incorporated by reference) for increasing concentration of a segment of a target sequence in a mixture of genomic DNA without cloning or purification. The process for amplifying the target sequence includes introducing an excess of oligonucleotide primers to a DNA mixture containing a desired target sequence, followed by a precise sequence of thermal cycling in the presence of a DNA polymerase. The primers are complementary to their respective strands of the double stranded target sequence.

To effect amplification, primers are annealed to their complementary sequence within the target molecule. Following annealing, the primers are extended with a polymerase so as to form a new pair of complementary strands.

The steps of denaturation, primer annealing and polymerase extension may be repeated many times (i.e., denaturation, annealing and extension constitute one cycle; there may be numerous cycles) to obtain a high concentration of an amplified segment of a desired target sequence. The length of the amplified segment of the desired target sequence is determined by relative positions of the primers with respect to each other, and therefore, this length is a controllable parameter.

Methods for performing PCR in droplets are shown for example in Link et al. (U.S. Patent application numbers 2008/0014589, 2008/0003142, and 2010/0137163), Anderson et al. (U.S. Pat. No. 7,041,481 and which reissued as RE41,780) and European publication number EP2047910 to Raindance Technologies Inc. The content of each of which is incorporated by reference herein in its entirety.

The first sample fluid contains nucleic acid templates. Droplets of the first sample fluid are formed as described above. Those droplets will include the nucleic acid templates. In certain embodiments, the droplets will include only a single nucleic acid template, and thus digital PCR may be conducted. The second sample fluid contains reagents for the PCR reaction. Such reagents generally include Taq polymerase, deoxynucleotides of type A, C, G and T, magnesium chloride, and forward and reverse primers, all suspended within an aqueous buffer. The second fluid also includes detectably labeled probes for detection of the amplified target nucleic acid, the details of which are discussed below. This type of partitioning of the reagents between the two sample fluids is not the only possibility. In certain embodiments, the first sample fluid will include some or all of the reagents necessary for the PCR whereas the second sample fluid will contain the balance of the reagents necessary for the PCR together with the detection probes.

Primers may be prepared by a variety of methods including but not limited to cloning of appropriate sequences and direct chemical synthesis using methods well known in the art (Narang et al., Methods Enzymol., 68:90 (1979); Brown et al., Methods Enzymol., 68:109 (1979)). Primers may also be obtained from commercial sources such as Operon Technologies, Amersham Pharmacia Biotech, Sigma, and Life Technologies. The primers may have an identical melting temperature. The lengths of the primers may be extended or shortened at the 5' end or the 3' end to produce primers with desired melting temperatures. Also, the annealing position of each primer pair may be designed such that the sequence and, length of the primer pairs yield the desired melting temperature. The simplest equation for determining the melting temperature of primers smaller than 25 base pairs is the Wallace Rule (Td=2(A+T)+4(G+C)). Computer programs may also be used to design primers, including but not limited to Array Designer Software (Arrayit Inc.), Oligonucleotide Probe Sequence Design Software for Genetic Analysis (Olympus Optical Co.), NetPrimer, and DNAsis from Hitachi Software Engineering. The TM (melting or annealing temperature) of each primer is calculated using software programs such as Oligo Design, available from Invitrogen Corp.

A droplet containing the nucleic acid is then caused to merge with the PCR reagents in the second fluid according to methods of the invention described above, producing a droplet that includes Taq polymerase, deoxynucleotides of type A, C, G and T, magnesium chloride, forward and reverse primers, detectably labeled probes, and the target nucleic acid.

Once mixed droplets have been produced, the droplets are thermal cycled, resulting in amplification of the target nucleic acid in each droplet. In certain embodiments, the droplets are flowed through a channel in a serpentine path between heating and cooling lines to amplify the nucleic acid in the droplet. The width and depth of the channel may be adjusted to set the residence time at each temperature, which may be controlled to anywhere between less than a second and minutes.

In certain embodiments, the three temperature zones are used for the amplification reaction. The three temperature zones are controlled to result in denaturation of double stranded nucleic acid (high temperature zone), annealing of primers (low temperature zones), and amplification of single stranded nucleic acid to produce double stranded nucleic acids (intermediate temperature zones). The temperatures within these zones fall within ranges well known in the art for conducting PCR reactions. See for example, Sambrook et al. (Molecular Cloning, A Laboratory Manual, 3rd edition, Cold Spring Harbor Laboratory Press, Cold Spring Harbor, N.Y., 2001).

In certain embodiments, the three temperature zones are controlled to have temperatures as follows: 95° C. ($T_H$), 550° C. ($T_L$), 72° C. ($T_M$). The prepared sample droplets flow through the channel at a controlled rate. The sample droplets first pass the initial denaturation zone ($T_H$) before thermal cycling. The initial preheat is an extended zone to ensure that nucleic acids within the sample droplet have denatured successfully before thermal cycling. The requirement for a preheat zone and the length of denaturation time required is dependent on the chemistry being used in the reaction. The samples pass into the high temperature zone, of approximately 95° C., where the sample is first separated into single stranded DNA in a process called denaturation. The sample then flows to the low temperature, of approximately 55° C., where the hybridization process takes place, during which the primers anneal to the complementary sequences of the sample. Finally, as the sample flows through the third medium temperature, of approximately 72° C., the polymerase process occurs when the primers are extended along the single strand of DNA with a thermostable enzyme.

The nucleic acids undergo the same thermal cycling and chemical reaction as the droplets pass through each thermal cycle as they flow through the channel. The total number of cycles in the device is easily altered by an extension of thermal zones. The sample undergoes the same thermal cycling and chemical reaction as it passes through N amplification cycles of the complete thermal device.

In other embodiments, the temperature zones are controlled to achieve two individual temperature zones for a PCR reaction. In certain embodiments, the two temperature zones are controlled to have temperatures as follows: 95° C. ($T_H$) and 60° C. ($T_L$). The sample droplet optionally flows through an initial preheat zone before entering thermal cycling. The preheat zone may be important for some chemistry for activation and also to ensure that double stranded nucleic acid in the droplets is fully denatured before the thermal cycling reaction begins. In an exemplary embodiment, the preheat dwell length results in approximately 10 minutes preheat of the droplets at the higher temperature.

The sample droplet continues into the high temperature zone, of approximately 95° C., where the sample is first separated into single stranded DNA in a process called denaturation. The sample then flows through the device to the low temperature zone, of approximately 60° C., where the hybridization process takes place, during which the primers anneal to the complementary sequences of the sample. Finally the polymerase process occurs when the primers are extended along the single strand of DNA with a thermostable enzyme. The sample undergoes the same thermal cycling and chemical reaction as it passes through each thermal cycle of the complete device. The total number of cycles in the device is easily altered by an extension of block length and tubing.

After amplification, droplets may be flowed to a detection module for detection of amplification products. The droplets may be individually analyzed and detected using any methods known in the art, such as detecting for the presence or amount of a reporter. Generally, the detection module is in communication with one or more detection apparatuses. The detection apparatuses may be optical or electrical detectors or combinations thereof. Examples of suitable detection apparatuses include optical waveguides, microscopes, diodes, light stimulating devices, (e.g., lasers), photo multiplier tubes, and processors (e.g., computers and software), and combinations thereof, which cooperate to detect a signal representative of a characteristic, marker, or reporter, and to determine and direct the measurement or the sorting action at a sorting module. Further description of detection modules and methods of detecting amplification products in droplets are shown in Link et al. (U.S. patent application numbers 2008/0014589, 2008/0003142, and 2010/0137163) and European publication number EP2047910 to Raindance Technologies Inc.

During amplification, fluorescent signal is generated in a TaqMan assay by the enzymatic degradation of the fluorescently labeled probe. The probe contains a dye and quencher that are maintained in close proximity to one another by being attached to the same probe. When in close proximity, the dye is quenched by fluorescence resonance energy transfer to the quencher. Certain probes are designed that hybridize to the wild-type of the target, and other probes are designed that hybridize to a variant of the wild-type of the target. Probes that hybridize to the wild-type of the target have a different fluorophore attached than probes that hybridize to a variant of the wild-type of the target. The probes that hybridize to a variant of the wild-type of the target are designed to specifically hybridize to a region in a PCR product that contains or is suspected to contain a single nucleotide polymorphism or small insertion or deletion.

During the PCR amplification, the amplicon is denatured allowing the probe and PCR primers to hybridize. The PCR primer is extended by Taq polymerase replicating the alternative strand. During the replication process the Taq polymerase encounters the probe which is also hybridized to the same strand and degrades it. This releases the dye and quencher from the probe which are then allowed to move away from each other. This eliminates the FRET between the two, allowing the dye to release its fluorescence. Through each cycle of cycling more fluorescence is released. The amount of fluorescence released depends on the efficiency of the PCR reaction and also the kinetics of the probe hybridization. If there is a single mismatch between the probe and the target sequence the probe will not hybridize as efficiently and thus a fewer number of probes are degraded during each round of PCR and thus less fluorescent signal is generated. This difference in fluorescence per droplet may be detected and counted. The efficiency of hybridization may be affected by such things as probe concentration, probe ratios between competing probes, and the number of mismatches present in the probe.

Another examples of assays are ELISA assays (see, e.g., US Patent Publication No. 20100022414). The present invention provides another emulsion library which may comprise a plurality of aqueous droplets within an immiscible fluorocarbon oil which may comprise at least one fluorosurfactant, wherein each droplet is uniform in size and may comprise at least a first antibody, and a single element linked to at least a second antibody, wherein said first and second antibodies are different. In one example, each library element may comprise a different bead, wherein each bead is attached to a number of antibodies and the bead is encapsulated within a droplet that contains a different antibody in solution. These antibodies may then be allowed to form "ELISA sandwiches," which may be washed and prepared for a ELISA assay. Further, these contents of the droplets may be altered to be specific for the antibody contained therein to maximize the results of the assay.

In another embodiment, single-cell assays are also contemplated as part of the present invention (see, e.g., Ryan et al., Biomicrofluidics 5, 021501 (2011) for an overview of applications of microfluidics to assay individual cells). A single-cell assay may be contemplated as an experiment that quantifies a function or property of an individual cell when the interactions of that cell with its environment may be controlled precisely or may be isolated from the function or property under examination. The research and development of single-cell assays is largely predicated on the notion that genetic variation causes disease and that small subpopulations of cells represent the origin of the disease. Methods of assaying compounds secreted from cells, subcellular components, cell-cell or cell-drug interactions as well as methods of patterning individual cells are also contemplated within the present invention.

In other embodiments, chemical prototyping and synthetic chemical reactions are also contemplated within the methods of the invention.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

Example

This example describes a precise and robust femtoliter droplet injector based on piezoelectric actuation. Precise volume of reagents, in the range of 5 to 600 fL, are injected within the droplet printer, with an integrated piezo actuator. The droplet printer is able to inject independently a non-limited number of femtoliter droplets containing different reagents.

Femtoliter droplets are produced before their injection, forbidding cross-contamination issues, and are re-injected with a piezoelectric actuator. Droplet production is obtained by a step-emulsification process. The phase to be dispersed flows on a thin channel and reaches a step resulting in the droplet generation. The phase to be dispersed is either flowing in a flow-focusing regime or without being pinched by continuous phase. The step-emulsification process enables robust generation of droplets at kHz rates, a high monodispersity (<3%) and a precise control of droplet size, from 5 to 600 fL. Parallelized production systems allow the obtention of flow rates on the order of 20 μL of emulsion per hour, corresponding to 2.10⁹ individual reactors to be re-injected later.

Injection of femtoliter volumes is enabled by the use of piezoelectric actuation, coupled to an integrated valve. Piezo stacks allow microsecond response times and low deflections (1-18 μm), corresponding to displacement volumes as low as 700 pL through a 1 mm diameter rod. This deflection is imposed to a pressurized monitoring chamber, slightly increasing its total volume, and releasing a single femtoliter droplet.

To generate the monitoring chamber, a PDMS membrane is created by pouring the PDMS over a custom insert, that defines a PDMS membrane of chosen thickness (300 μm) and diameter (1-3 mm). This thin membrane enables precise positioning of the piezo actuator, and total transmission of the deflection to the monitoring chamber. No low-pass filtering effect is expected, enabling microsecond actuation of the valve.

Precise control of the number of injected droplets can be obtained by monitoring the pressure in the droplet channel, the voltage applied to the piezo, and the pulse duration. Parallelization of the femtoliter droplet injectors is performed using a relay.

The invention will be further described by the following numbered paragraphs:

1. An apparatus for creating a library of emulsion outlooks via a microfluidic system, comprising:

a carrier fluid channel having a carrier fluid flowing therein at an adjustable or predetermined flow rate;

a plurality of droplet generators or a plurality of droplet dispensers wherein each droplet generator having a reagent fluid supply means for providing reagent fluid to the droplet generator and an outlet channel, the outlet channel in fluid communication with a first fluid channel and a means for transferring a predetermined amount of reagent fluid from the supply means to the outlet channel such that a reagent droplet of predetermined amount is caused to enter the carrier fluid or wherein each droplet dispenser having a supply of droplets in the form of a water-in-oil emulsion and an outlet channel, the outlet channel in fluid communication with a first fluid channel and a means for transferring a predetermined volume of emulsion from the supply means to the outlet channel such that a predetermined volume of emulsion is caused to enter the carrier fluid;

a controller in communication with the plurality of droplet generators for controlling the means for transferring a predetermined amount of fluid in each droplet generator.

2. The apparatus according to paragraph 1, wherein each droplet generator or each droplet dispenser deposits droplets directly into the first fluid channel.

3. The apparatus according to paragraph 1, further comprising a microfluidic channel in fluid communication with the carrier fluid channel for receiving carrier fluid having droplets therein and maintaining said droplets in predetermined groups;

a microfluidic cross-channel in fluid communication with the microfluidic channel and having a plurality of emulsion droplets flowing therein; and means for merging reagent droplets with the emulsion droplets.

4. The apparatus according to paragraph 3, further comprising a detector in the microfluidic cross-channel for detecting passage of an emulsion droplet in the microfluidic cross-channel and for transmitting a signal to the controller to control release of reagent droplets from the droplet generators for merging with the emulsion droplet.

5. The apparatus according to any one of paragraphs 1-4, wherein the means for transferring the predetermined amount of reagent fluid is a piezoelectric actuator.

6. The apparatus according to any one of paragraphs 3-5, wherein the microfluidic cross-channel is orthogonal to the microfluidic channel.

7. The apparatus according to any one of paragraphs 3-6, wherein the means for merging is an electrode assembly.

8. The apparatus according to any one of paragraphs 1-7, wherein the reagent fluid comprises a chemical reagent, a protein, a drug, an antibody, an enzyme, a nucleic acid or any combination thereof.

9. The apparatus according to any one of paragraphs 1-8, wherein said droplets in predetermined groups comprises more than one predetermined amount.

10. The apparatus according to paragraph 9, wherein the one predetermined amount is one droplet.

11. The apparatus according to paragraph 9 or 10, wherein the more than one predetermined amount is two or more droplets.

12. The apparatus according to any one of paragraphs 1-11, wherein the means for merging reagent droplets with the emulsion droplets comprises timing of the merging.

13. The apparatus according to paragraph 12, wherein the timing comprises the reagent droplet enters a stream with and behind the emulsion droplet in the flow channel.

14. The apparatus according to paragraph 12 or 13, wherein the timing slows the merging of reagent droplets with the emulsion droplets.

15. The apparatus according to paragraph 14, wherein a microfluidic channel is widened to slow the merging.

16. The apparatus according to any one of paragraphs 1-15, wherein coalescence of reagent droplets with the emulsion droplets results comprises merging of the droplets into a single droplet.

17. The apparatus according to paragraph 16, wherein aqueous solutions are combined in the single droplet.

18. The apparatus according to any one of paragraphs 1-17, wherein the apparatus is a droplet on demand device.

19. A method of creating a library of emulsion outlooks, comprising:

flowing a carrier oil in a carrier fluid channel;

releasing a plurality of reagent droplets into the carrier oil;

maintaining the plurality of reagent droplets in a microfluidic channel;

flowing a series of emulsion droplets in a micro-fluidic cross-channel in fluid communication with the microfluidic channel;

introducing the plurality of reagent drops in the predetermined grouping into the micro-fluidic cross-channel; and causing the plurality of reagent drops in the predetermined grouping to merge with a predetermined one of the emulsion droplets.

20. The method according to paragraph 19, further comprising detecting the presence of an emulsion droplet at a predetermined location in the microfluidic cross-channel and causing releasing of the plurality of reagent droplets in the carrier oil upon detection of such presence of the emulsion droplet.

21. The method according to paragraph 19 or 20, further comprising testing the predetermined one of the emulsion droplets merged with the plurality of reagent droplets in the predetermined grouping.

22. The method according to any one of paragraphs 19-21, wherein the step of releasing the plurality of reagent droplets in the carrier oil comprises:

causing a predetermined amount of reagent fluid to be placed in the carrier oil from at least one droplet generator in response to an actuation signal, wherein flow of the carrier oil causes the predetermined amount reagent fluid to be sheared off into the flow of the carrier oil thereby forming a droplet.

23. The method according to paragraph 22, wherein the step of releasing a predetermined amount of reagent fluid is controlled by a piezoelectric actuator.

24. The method according to paragraph 23, comprising one or more piezoelectric actuators.

25. The method according to paragraph 24, wherein the one or more piezoelectric actuators each comprises a different reagent.

26. The method according to paragraph 25, wherein the one or more piezoelectric actuators each comprises a different number of droplets, thereby creating a matrix of test conditions.

27. The method according to any one of paragraphs 19-26, further comprising barcoding of the reagent drops.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. An apparatus for creating a droplet library via a microfluidic system, the apparatus comprising:
   (a) a carrier fluid channel having a carrier fluid flowing therein at an adjustable or predetermined flow rate;
   (b) a plurality of droplet dispensers, each of which is in fluid communication with the carrier fluid channel for dispensing the contents therein into the carrier fluid flowing in the carrier fluid channel, wherein each droplet dispenser comprises:
      (i) a supply of pre-formed reagent droplets in a reagent emulsion; and
      (ii) an outlet channel,
      wherein the outlet channel is in fluid communication with the carrier fluid channel for the transfer of a predetermined group of pre-formed reagent droplets or an on-demand volume of reagent fluid emulsion from the droplet dispenser into the carrier fluid;
   (c) two or more controlled actuators, wherein each controlled actuator is connected to a droplet dispenser, and wherein activation of the two or more controlled actuators releases distinct species of pre-formed reagent droplets from the droplet dispensers;
   (d) a focusing channel, wherein the focusing channel and the outlet channel of each droplet dispenser are in fluid communication, and wherein the focusing channel is configured to group the reagent droplets into a set of droplets;
   (e) a microfluidic cross-channel, wherein the microfluidic cross-channel and the focusing channel are in fluid communication at a 'T' junction, and wherein the microfluidic cross-channel comprises an emulsion droplet upstream of the junction;
   (f) a detector for detecting the emulsion droplet, wherein the detector is disposed in the microfluidic cross-channel and upstream of the junction, wherein the detector is in electronic communication with the two or more controlled actuators, and wherein the emulsion droplet is larger than the pre-formed reagent droplets; and
   (g) a feedback control system for coordinating activation of the two or more controlled actuators upon detection of the emulsion droplet by the detector so that arrival of the set of droplets at the junction coincides with arrival of the emulsion droplet at the junction such that the set of droplets arrives at the junction behind the target droplet and, due to their smaller size, catch up to the larger droplet prior to arrival at a merging feature disposed downstream of the junction for merging the set of droplets with the emulsion droplet.

2. The apparatus of claim 1, wherein the merging feature is an electrode assembly.

3. The apparatus of claim 1, wherein the carrier fluid comprises a chemical reagent, a protein, a drug, an antibody, an enzyme, a nucleic acid or any combination thereof.

4. The apparatus of claim 1, wherein the distinct species of reagent droplets each have different reagents therein.

5. The apparatus of claim 1, wherein each droplet dispenser dispenses on-demand a defined volume of reagent emulsion into the flow stream of carrier fluid.

6. The apparatus of claim 5, wherein the defined volume of reagent emulsion corresponds to a defined number of pre-formed reagent droplets.

7. The apparatus of claim 1, wherein the apparatus is a droplet on-demand device.

8. The apparatus of claim 1, wherein the reagent comprises a chemical reagent, a protein, a drug, an antibody, an enzyme, a nucleic acid or any combination thereof.

9. The apparatus of claim 1, wherein the two or more controlled actuators are each piezoelectric actuators.

10. The apparatus of claim 1, wherein the two or more controlled actuators comprise a piezoelectric printing array.

11. An apparatus for creating a droplet library via a microfluidic system, the apparatus comprising:
    (a) a carrier fluid channel having a carrier fluid flowing therein at an adjustable or predetermined flow rate;
    (b) a plurality of droplet dispensers, each of which is in fluid communication with the carrier fluid channel for dispensing the contents therein into the carrier fluid flowing in the carrier fluid channel, wherein each droplet dispenser comprises:
       (i) a supply of reagent fluid; and
       (ii) an outlet channel,
       wherein the outlet channel is in fluid communication with the carrier fluid channel for the transfer of an on-demand volume of reagent fluid from the droplet dispenser into the carrier fluid, thereby releasing a droplet, wherein the droplet dispensers are each disposed within an array structure, wherein passageways are formed between an exterior of the array structure and an exterior structure of the droplet dispensers, and wherein droplets are released from the droplet dispensers in a direction perpendicular to the flow of the fluid flowing in the carrier fluid channel;
    (c) two or more controlled actuators, wherein each controlled actuator is connected to a droplet dispenser, and wherein activation of the two or more controlled actuators releases distinct species of reagent droplets from the droplet dispensers;
    (d) a focusing channel, wherein the focusing channel and the outlet channel of each droplet dispenser are in fluid communication, and wherein the focusing channel is configured to group the reagent droplets into a set of droplets;

(e) a microfluidic cross-channel, wherein the microfluidic cross-channel and the focusing channel are in fluid communication at a 'T' junction, and wherein the microfluidic cross-channel comprises an emulsion droplet upstream of the junction;
(f) a detector for detecting the emulsion droplet, wherein the detector is disposed in the microfluidic cross-channel and upstream of the junction, wherein the detector is in electronic communication with the two or more controlled actuators, and wherein the emulsion droplet is larger than the reagent droplets; and
(g) a feedback control system for coordinating activation of the two or more controlled actuators upon detection of the emulsion droplet by the detector so that arrival of the set of droplets at the junction coincides with arrival of the emulsion droplet at the junction such that the set of droplets arrives at the junction behind the target droplet and, due to their smaller size, catch up to the larger droplet prior to arrival at a merging feature disposed downstream of the junction for merging the set of droplets with the emulsion droplet.

* * * * *